UNITED STATES PATENT OFFICE.

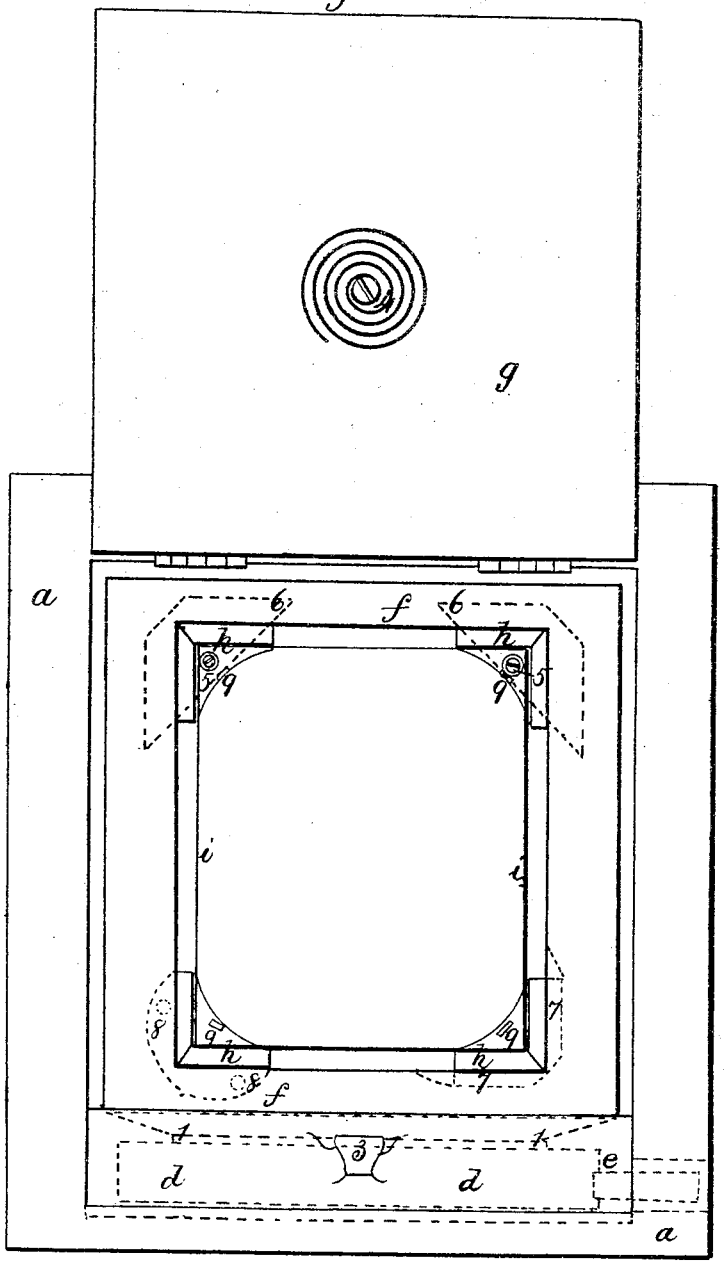
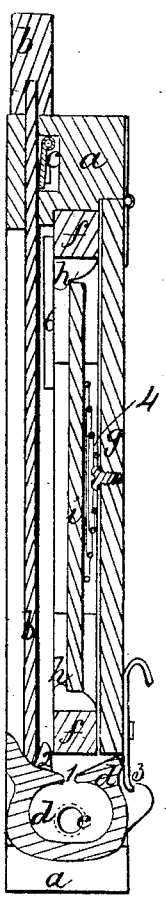
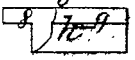
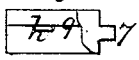
W. & W. H. Lewis,
Frames for Photographic Glasses,
No. 15,854. Patented Oct. 7, 1856.

WILLIAM LEWIS AND WILLIAM H. LEWIS, OF NEW YORK, N. Y., ASSIGNORS TO MALONZO J. DRUMMOND, OF SAME PLACE.

PLATE-HOLDER FOR PHOTOGRAPHIC CAMERAS.

Specification forming part of Letters Patent No. 15,854, dated October 7, 1856.

*To all whom it may concern:*

Be it known that we, WILLIAM LEWIS and WILLIAM H. LEWIS, of the city and State of New York, have invented, made, and applied to use certain new and useful Improvements in Frames for Glasses and other Plates Used in Taking Ambrotypes, Photographs, and Similar Pictures; and we do hereby declare that the following is a full, clear, and exact description of the construction and operation of the same, reference being had to the annexed drawings, making part of this specification, wherein—

Figure 1 is an elevation of said frame as opened to receive a glass or other plate. Fig. 2 is a vertical section of said frame, and Figs. 3 and 4 are detached views of the glass corners made use of in said frame to support the plate.

Similar marks of reference denote corresponding parts.

In taking ambrotypes, photographs, and similar pictures the glass or other plate is placed in the frame immediately after the same has been taken out of the nitrate-of-silver bath or similar chemical solution. Hence the liquid drops off said plate into the frame and in handling often runs onto the operator's clothes, or else onto the carpets or floor, causing a permanent stain or injury. Another source of trouble in taking the said pictures is that the moist collodion and chemical substances on the corners of the plate adhere to the edges of the frame and rabbet and prevent the plate coming properly into focus, at the same time that this dirt and chemical matter stains the collodion or other chemicals on the plates, often being absorbed to such an extent as to become a blemish on the background.

The nature of our invention consists in the use of glass or similarly vitrified corners in the frame that receive the corners of the glass or other plate, the said corners each being formed of one solid piece of vitrified material, so that there is no chance for the chemicals to come in contact with any material that will cause discoloration. We also introduce a receptacle into the bottom of the frame or holder that catches any drippings from the plate and retains the same, even if the holder is laid down on its side.

In the drawings, $a$ is a frame or holder adapted to the camera, in which the picture is to be taken.

$b$ is the slide, and $c$ the valve or strip, to exclude light, all as usual, except that the lower part of the frame is fitted to receive the chamber or receptacle $d$, that is formed somewhat similar to a horizontal bottle with a slot in its upper side. This receptacle can be of glass, porcelain, or any suitable material, and is fitted with a neck $e$ to receive a cork or stopper, (shown by dotted lines in Fig. 1,) the same passing through a hole in the frame $a$. The upper side of this receptacle is formed dishing, so as to pass all drippings into the opening 1, and small projections 2 2 are provided to cause the lower edge of the slide $b$ to set tightly against the edge of the receptacle $d$.

$f$ is the frame receiving the glass or other plate, and this is entered into suitable rabbets in the frame $a$, and $g$ is a back hinged on and provided with a catch 3 and with a spring 4 to keep the glass or plate $i$ properly in place, as usual.

$h$ $h$ are solid corners, of glass or other vitrified material, secured into the angles of the frame $f$, and as these corners may be attached by different means we have shown at 5 5 small screws passing through holes in said corner-pieces into diagonal pieces 6 6, attached to the frame, and over the heads of said screws suitable cement is placed, but the same must be below the surface of the glass corners.

At 8 8 we have shown a flange formed on the back of the glass corner, receiving screws that pass into the frame $f$; but we prefer the peculiar construction of corner shown in Fig. 3, wherein a rib 7 on each outer edge of the corner sets into a groove in the inner sides of the frame and is there cemented without the use of screws. The frames $a$ $f$ should be coated with linseed-oil or suitable varnish.

We are aware that pieces of glass have been inserted in the corners of plate-frames to take the place of the glass or other plate, but said pieces of glass are very apt to become loose. The cementing made use of comes in contact with the corners and edges of the glass or other plate and discolors the same, and there is no chance for keeping the corners clean.

In view of the foregoing, the nature and utility of our invention will be apparent, for the solid glass or vitrified corner can always be kept clean, and there is nothing that comes in contact with either the surface or the edges of the glass or other plate but the said vitrified corners.

At 9 9 small projections are shown on these vitrified corners, which, being slightly elevated, always take the plate and are wiped off with greater ease, so as to insure a proper focal position for the plate.

What we claim, and desire to secure by Letters Patent, is—

1. Forming the glass or vitrified corners $h$ with a flange or rim in one solid piece, the said flange or rim taking the edges of the photographic glass or other plate, substantially as and for the purposes specified, and irrespective of the manner in which the said vitrified corners are attached to the frame.

2. The receptacle $d$, below the glass or other plate, to catch any dripping from said plate, substantially as specified.

In witness whereof we have hereunto set our signatures this 16th day of August, 1856.

WILLM. LEWIS.
W. H. LEWIS.

Witnesses:
CHAS. K. SMITH,
LEMUEL W. SERRELL.